United States Patent [19]
Matsumoto

[11] Patent Number: 5,239,388
[45] Date of Patent: Aug. 24, 1993

[54] IMAGE PROCESSING SYSTEM

[75] Inventor: Fuminari Matsumoto, Kanagawa, Japan

[73] Assignee: Fuji Xerox Co., Ltd., Tokyo, Japan

[21] Appl. No.: 627,827

[22] Filed: Dec. 14, 1990

[51] Int. Cl.$^5$ ............................................. H04M 1/40
[52] U.S. Cl. .................................... 358/448; 358/296; 358/444; 358/451; 382/46
[58] Field of Search ............... 358/449, 450, 451, 488, 358/444, 448, 296; 382/47, 46; 271/184, 185; 355/322, 325

[56] References Cited

U.S. PATENT DOCUMENTS

| | | | |
|---|---|---|---|
| 4,271,476 | 6/1981 | Lotspiech | 382/46 |
| 4,658,430 | 4/1987 | Anderson et al. | 382/46 |
| 4,703,515 | 10/1987 | Baroody, Jr. | 382/46 |
| 4,837,845 | 6/1989 | Pruett et al. | 382/46 |
| 5,034,733 | 7/1991 | Okazawa et al. | 382/46 |
| 5,038,218 | 8/1991 | Matsumoto | 358/296 |
| 5,051,779 | 9/1991 | Hikawa | 355/200 |
| 5,077,811 | 12/1991 | Onda | 382/46 |

Primary Examiner—Edward L. Coles, Sr.
Attorney, Agent, or Firm—Finnegan, Henderson, Farabow, Garrett & Dunner

[57] ABSTRACT

An image processing system with improved copy outputting efficiency comprising a user interface for forming a copy job, an image output terminal for outputting a hard copy of an image, an image input terminal for reading an original to output digital image data having a predetermined number of bits, a control unit for collectively controlling the operation of the system, a storage unit including a page memory and a hard disk, and a rotating unit for rotating an image by 90°.

44 Claims, 12 Drawing Sheets

FIG. 2(A)
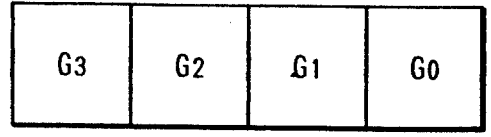
FIG. 2(B)
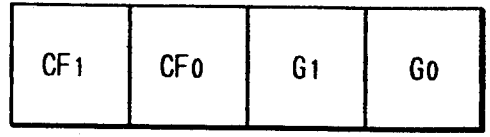
FIG. 2(C)
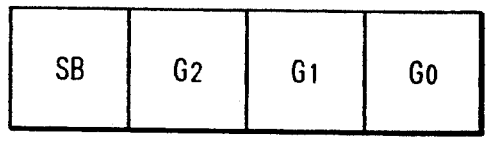
FIG. 3
| 0 B0 | 0 B1 | 0 B2 | 0 B3 | 1 B0 | 1 B1 | 1 B2 | 1 B3 | 2 B0 | 2 B1 | 2 B2 | 2 B3 | 3 B0 | 3 B1 | 3 B2 | 3 B3 |
|---|---|---|---|---|---|---|---|---|---|---|---|---|---|---|---|
| 4 B0 | 4 B1 | 4 B2 | 4 B3 | 5 B0 | 5 B1 | 5 B2 | 5 B3 | — | — | — | — | — | | | |
| | | | | | | | | | | | | | | | |
| | | | | | | | | | | | | | | | |

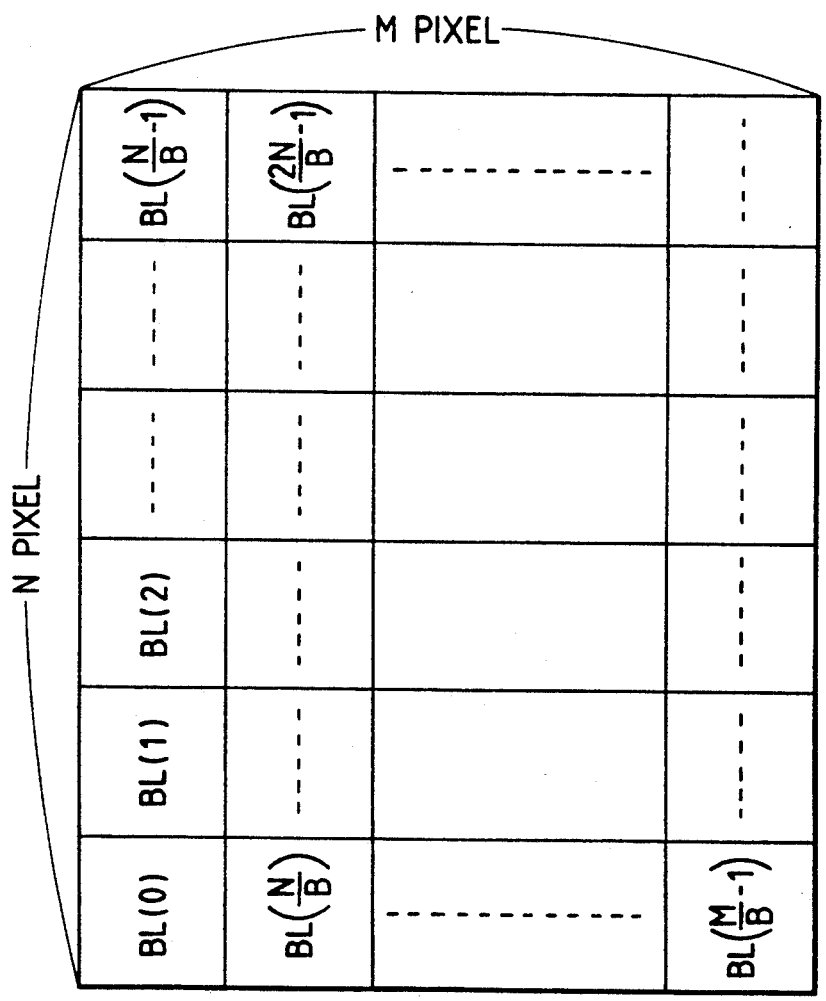

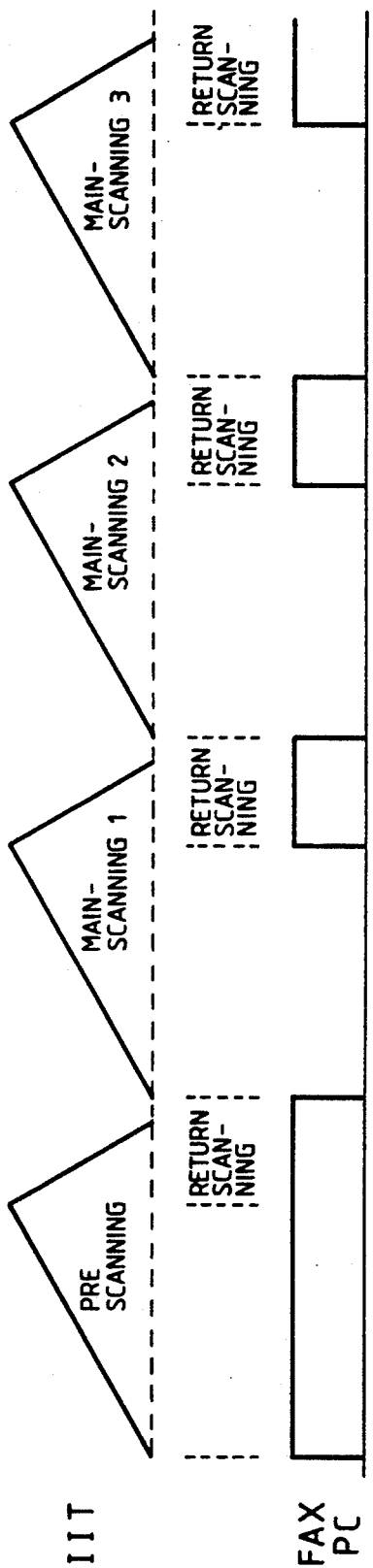

IMAGE PROCESSING SYSTEM

BACKGROUND OF THE INVENTION

1. Field of the Invention

This invention relates to an image processing system, and more particularly, to an image processing system in which image data are stored and processed as required so as to be outputted as a hard copy.

2. Discussion of the Related Art

An image processing system has been developed in which not only are original image data read with an image reading unit, but also image data formed with a personal computer ("PC") and image data received through a facsimile ("FAX") are processed as required. The processed image data thus are outputted, as hard copies, by the same image outputting unit. One example of the image processing system is shown in FIG. 15.

The image processing system, as shown in FIG. 15 comprises storage unit 65, PC 61, bit-mapping circuit 62, image reading unit 64, FAX 63, image outputting unit 67, and control unit 66.

Storage unit 65, comprising a page memory and/or a hard disk ("HD"), is adapted to temporarily store image data. Storage unit 65 also is used in performing various editing operations, such as a masking process of removing part of an image, a trimming process of extracting part of an image, and a cutting and pasting process in which the image of a selected area of an original is cut out and pasted in a selected area of a second original.

PC 61 has an input unit comprising a keyboard and a pointing device, and an output unit comprising a color CRT (cathode ray tube). The units are used to form documents, patterns, tables, etc.

Bit-mapping circuit 62 codes data provided by PC 61 into a bit map.

The image reading unit 64 has a line sensor made up of a CCD (charge-coupled device) and its drive circuit. Image reading unit 64 outputs each pixel as digital image data having a predetermined number of bits.

FAX 63 converts code data received through a telephone line, such as CCITT code data, into image data.

Image outputting unit 67 makes a hard copy according to image data received. Image outputting unit 67 includes, for instance, a black color developing unit, and when necessary, a single or a plurality of color developing units.

Control unit 66 comprises a microcomputer that controls the operation of the image processing system according to a copy job formed by a user's interface ("UI", not shown). Thus, control unit 66 controls the processing of image data stored in the page memory.

The image processing system includes PC 61, image reading unit 64 and FAX 63 to form digital image data. All of these devices commonly use image outputting unit 67.

Where the copy job formed by the UI is to output the image data as a hard copy formed by PC 61, control unit 66 supplies the image data formed by PC 61 to image outputting unit 67. If, in this operation, the output of PC 61 is bit map data, then it is applied to the image outputting unit 67 as it is. On the other hand, if the output of PC 61 is code data, it is applied to image outputting unit 67 after being bit-mapped by bit-mapping circuit 62.

When the copy job formed by the UI is to output, as a hard copy, the image data of an original read with image reading unit 64, control unit 66 applies the output of image reading unit 64 to image outputting unit 67.

When the copy job is to output, as a hard copy, the image data received through FAX 63, control unit 66 supplies the image data, which is bit-mapped and decoded by FAX 63, to image outputting unit 67.

When an instruction is made to perform a process of masking a selected area of an image read with image reading unit 64, control unit 66 operates as follows. Control unit 66 writes the image data, which has been received from the image reading unit 64, in storage unit 65. The image data thus written is applied to image outputting unit 67 after being subjected to masking in storage unit 65.

The conventional image processing system as shown in FIG. 15, however, has no function for rotating an image. Accordingly, the editing operations applicable to an image are limited in content, and it is difficult to improve the productivity of the system as a whole.

For example, the maximum size of an original document that can be read with the image reading unit 64 is A3. A problem arises if the image processing system is required to take two A3 size originals and to print them out on one A3 size recording sheet. As shown in FIG. 16(A), the A3 size original 70 is read beginning with the short side. Because the system cannot rotate an image read, the images of the two A3 size originals must be reduced by 50%, and printed out on one A3 size recording sheet, as shown in FIG. 16(B), where reference numerals 71 and 72 designate the images of the two A3 size originals reduced in the above-described manner. As shown in FIG. 16(B), however, the resulting image will have blank area 73.

In this specification, the terms "lateral recording sheets" and "lateral reading" are intended to mean that a recording sheet is fed, or an original is read beginning with its short side. Similarly, the terms "longitudinal recording sheets" and "longitudinal reading" are intended to mean that a recording sheet is fed, or an original is read beginning with its long side.

Assume that A4 size lateral recording sheets and A4 size longitudinal recording sheets are loaded in image outputting unit 67. If an A4 size original is read with image reading unit 64 in the lateral direction, and the image of the original is outputted as a hard copy by image outputting unit 67, the A4 size lateral recording sheets will be used. If the supply of lateral recording sheets is used up, an alarm will be given to request that the operator replenish the A4 size lateral recording sheets. With the conventional system, therefore, it is necessary to perform the troublesome and time consuming operation of replenishing the image outputting unit with recording sheets even though A4 size longitudinal recording sheets are available. Thus, the productivity of the conventional system is relatively low.

In general, FAX 63 receives an A4 size lateral image. When the received images are to be printed out by image outputting unit 67 and no A4 size lateral recording sheets are loaded in image outputting unit 67, an alarm will be given to request the operator to replenish the unit 67 with the recording sheets.

Thus, the copying operation of the conventional image processing system is carried out only when recording sheets are available in the image outputting unit which are the same size and are read in the same direction as the image. Therefore, when recording sheets are placed in a direction different from the direction of reading an original, even if they are the same size as the image outputted, it is necessary to perform the troublesome operation of replenishing the image outputting unit with recording sheets.

SUMMARY OF THE INVENTION

The present invention has been made in view of the above circumstances and has as an object providing an image processing system in which images read are rotated when necessary.

Another object of the present invention is an image processing system that eliminates the limitations which the conventional image processing systems have in editing functions.

A further object of the present invention is an image processing system having increased productivity.

Additional objects and advantages of the present invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, as embodied and broadly described herein, the image processing system of this invention comprises a user interface for forming a copy job, an image output terminal for outputting an image as a hard copy, an image input terminal for reading an original and outputting digital image data having a predetermined number of bits, a storage unit for storing the image data, a rotating unit for rotating an image up to 90 degrees, and a control unit controlling the rotating unit to perform an image rotating operation.

BRIEF DESCRIPTION OF THE DRAWINGS

The accompanying drawings, which are incorporated in and constitute a part of this specification, illustrate an embodiment of the invention and, together with the description, serve to explain the objects, advantages, and principles of the invention.

In the drawings,

FIGS. 2(A) through FIG. 2(C) is an explanatory diagram showing one example of the structure of image data;

FIG. 3 is an explanatory diagram for a description of a serial pack storage system;

FIG. 10 is an explanatory diagram for a description of a block inside rotation in a CCW 90° rotation mode;

FIG. 11 is an explanatory diagram for a description of a block rotation in the CCW 90° rotation mode;

FIG. 12 is an explanatory diagram for a description of a multi-function concurrent job;

DETAILED DESCRIPTION OF THE PREFERRED EMBODIMENTS

According to a preferred embodiment of the present invention, a control unit drives a rotating unit to rotate an image through 90° clockwise ("CW"), 90° counter-clockwise ("CCW"), or 180° as requested by the UI, or when the control unit judges that the direction of the image inputted in the system is different from the desirable direction of the image outputted by the image outputting unit. Therefore, when size A4 recording sheets are set in the image output terminal ("IOT") in the longitudinal direction, and the image input terminal ("IIT") reads the image data of an original in the lateral direction, the control unit causes the image to be rotated through 90° CW or 90° CCW prior to supply to the IOT. Thus, when paper with a size that is the same as the image data of the original is set in the IOT, the direction of the image data of the original can be rotated to match the direction of paper set in the IOT.

Figure 1:
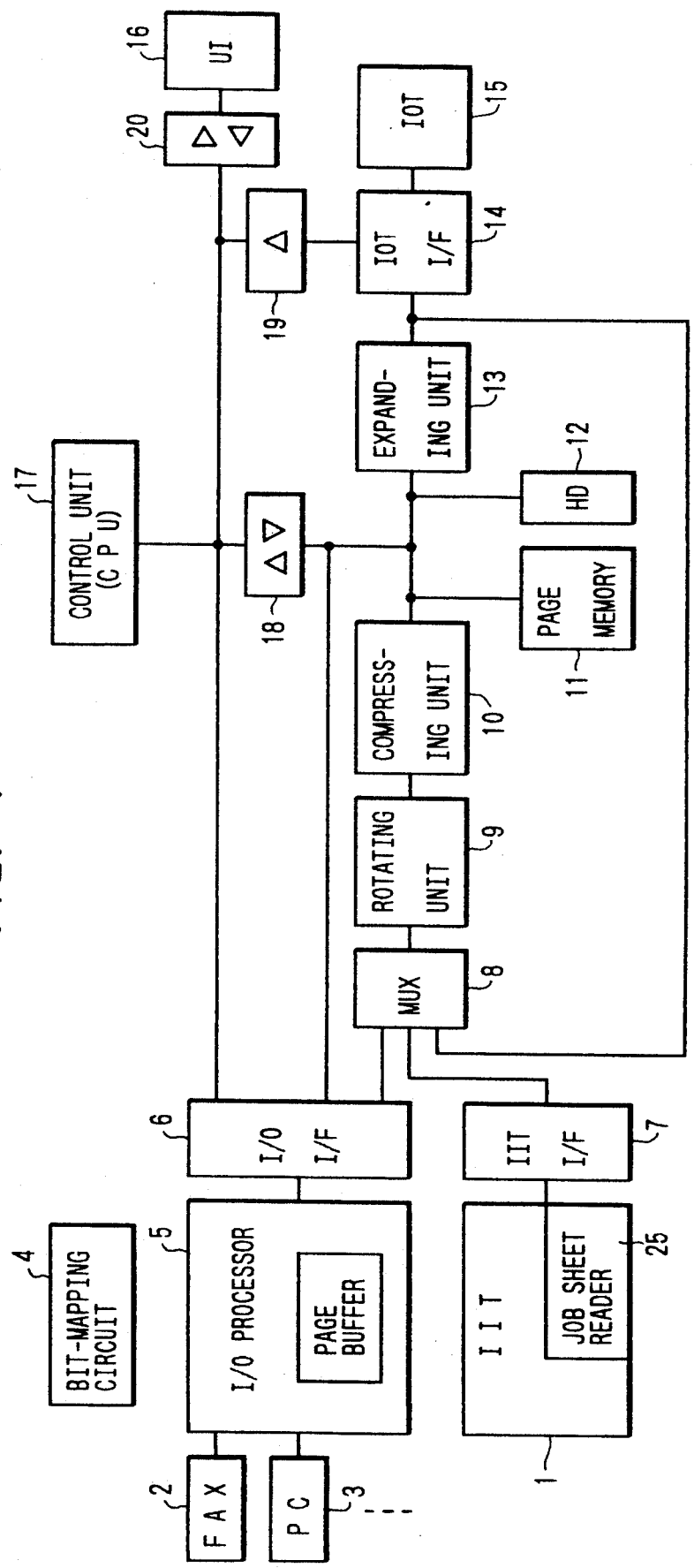
FIG. 1 is a block diagram showing an arrangement of an embodiment of an image processing system according to the present invention.

Preferred embodiments of this invention will be described with reference to the accompanying drawings. One embodiment of an image processing system according to the invention, as shown in FIG. 1, comprises IIT 1, FAX 2, PC 3, bit-mapping circuit 4, I/O processor 5, I/O interface 6, IIT interface 7, multiplexer ("MUX") 8, rotating unit 9, compressing unit 10, page memory 11, HD 12, expanding unit 13, IOT interface 14, IOT 15, UI 16, control unit 17, and bus controllers 18, 19, and 20.

IIT 1 reads an original with a color sensor, and outputs image data having a predetermined number of bits. For convenience in description it is assumed that in the image data, each pixel is represented by four bits. All four bits may be used to represent gradation data G, as shown in FIG. 2(A). Alternatively, two bits may be used to represent gradation data $G_0$ and $G_1$ and to two bits to represent color flags $CF_1$ and $CF_2$ indicating the color data of the pixel. Also, three bits may be used to represent gradation data $G_0$, $G_1$ and $G_2$ and the fourth bit may be used as a characteristic bit SB representing the characteristic of the pixel, such as when the image is of a photograph, as shown FIG. 2(C).

The IIT 1 also includes a job sheet reader 25 coupled to the IIT I/F 7 to receive scanned image data and to determine whether the document corresponding to the scanned image data is a job control sheet or a document original.

FAX 2 operates to convert code data received through a telephone line, such as CCITT code data, into image data.

PC 3 has input means comprising a keyboard and a pointing device (mouse), and output means comprising a color CRT. The units are used to form documents, patterns, tables, etc.

Bit-mapping circuit 4 develops the code data, which is received from PC 3, into a binary bit map.

I/O processor 5 has a network function, and receives binary data decoded by FAX 2 and code data formed by PC 3 and transmits the data to I/O interface 6, or causes bit mapping circuit 4 to develop the code data into binary data and transfer the binary data to I/O interface 6. Furthermore, I/O processor 5 receives code data from I/O interface 6, develops it into a bit map with bit-mapping circuit 4, and transfers the binary data of the bit map to I/O interface 6. In addition, I/O processor 5 receives from I/O interface 6 the image data obtained by reading an original with IIT 1, and transmits it to FAX 2. I/O processor 5 has a page buffer. When it is impossible for I/O processor 5 to transmit the data received from external equipment, such as FAX 2 and PC 3 immediately to the I/O interface 6, the data is temporarily stored in the page buffer.

I/O interface 6, connected to I/O processor 5, also is connected to MUX 8, the bus lines of page memory 11, HD 12, and control unit 17.

MUX 8 selects the transmission of data between rotating unit 9 and IIT interface 7, I/O interface 6 and the output of expanding unit 13. Rotating unit 9 will be described later in more detail.

Compressing unit 10 operates in a compression mode or in a through mode. In the compression mode, compressing unit 10 compresses image data according to an adaptive predication coding system, for example. In the adaptive predication coding system, the data pattern of a predictor is compared with the image data every unit of pixel or pixels by a predictor. If no error occurs, "0" is assigned to the error data to execute run-length coding and the predictor is used continuously to compress the image data. On the other hand, if an error occurs, an error data code corresponding to the error data is assigned and the predictor is changed to the next predictor to compare the image data. The compressed data is decompressed or expanded into the original image data by a expanding unit 13 including a plurality of reverse predictors which are used in a predetermined order. Therefore, when the image data is provided by IIT 1, the above-described adaptive prediction coding process is carried out for the image data of four bits per pixel.

In the through mode, the input image data is outputted as it is without compression. Therefore, the compressing unit is placed in the through mode in an editing operation, such as the rotation or synthesization of images.

Page memory 11 and HD 12 store image data. The image data inputted is stored in page memory 11 and is then transferred to HD 12. In general, the access time of HD 12 is of the order of 1 Mbyte/sec. Therefore, usually there is a gap between the speed of transfer of input image data and the access time of HD 12. Page memory 11 is provided in order to eliminate this speed gap.

Page memory 11 may employ a so-called "bit plane system" in which four plane memories are used to store image data of four bits, respectively. In addition, page memory 11 may employ a seal pack memory system in which, as shown in FIG. 3, one memory is used, and the four bits $B_0$, $B_1$, $B_2$, and $B_3$ of the 0-th pixel (indicated by "0" in FIG. 3) are written, in a serial mode, in the first four successive addresses, respectively. The four bits $B_0$, $B_1$, $B_2$ and $B_3$ of the first pixel (indicated by "1" in FIG. 3) are written, in a serial mode, in the next four successive addresses, respectively, and so forth.

Expanding unit 13 has an expansion mode and a through mode. Expanding unit 13 operates to restore data, expanding it into its original data. The through mode is used to output the image data which is not compressed by compressing unit 10. The output data of expanding unit 13 is supplied through IOT interface 14 to IOT 15, so as to be outputted as a hard copy, or it is applied through bus controllers 19 and 20 to UI 16 so as to be displayed on the CRT for editing.

IOT 15 comprises a photoreceptor, a developing unit, and a fusing unit. IOT 15 forms a latent electrostatic image in the photoreceptor, develops the latent electrostatic image with toner, transfers the developed image onto an image recording sheet, and fuses it. In general, the developing unit is a black color developing unit. A color developing unit is employed when necessary.

UI 16 comprises a CRT display unit and a control panel, and operates as follows. UI 16 forms a copy job including the setting of the number of copies, the selecting of the device for printing the output image data, the setting of various functions and editing operations, and displays the contents of the copy job thus formed. As was described above, UI 16 can receive image data through expanding unit 13, IOT interface 14, and bus controllers 19 and 20, and can display the received image data. Therefore, UI 16 can set an editing area, and furthermore can confirm the output image of IOT 15 before outputting it as a hard copy.

Bus controllers 18, 19, and 20 control the transmission of data between the bus of control unit 17, the bus of page memory 11 and HD 12, the bus of IOT interface 14 and the bus of UI 16.

Control unit 17 comprises a microcomputer and performs, according to the copy job set by UI 16, a variety of image processing operations, such as an editing operation. Control unit 17 generally controls the whole operation of the image processing system. According to a preferred embodiment of the present invention, control unit 17 controls the angle of rotation of an image.

Furthermore, a job control sheet may be used to select desired functions in a copy job.

Figure 13:
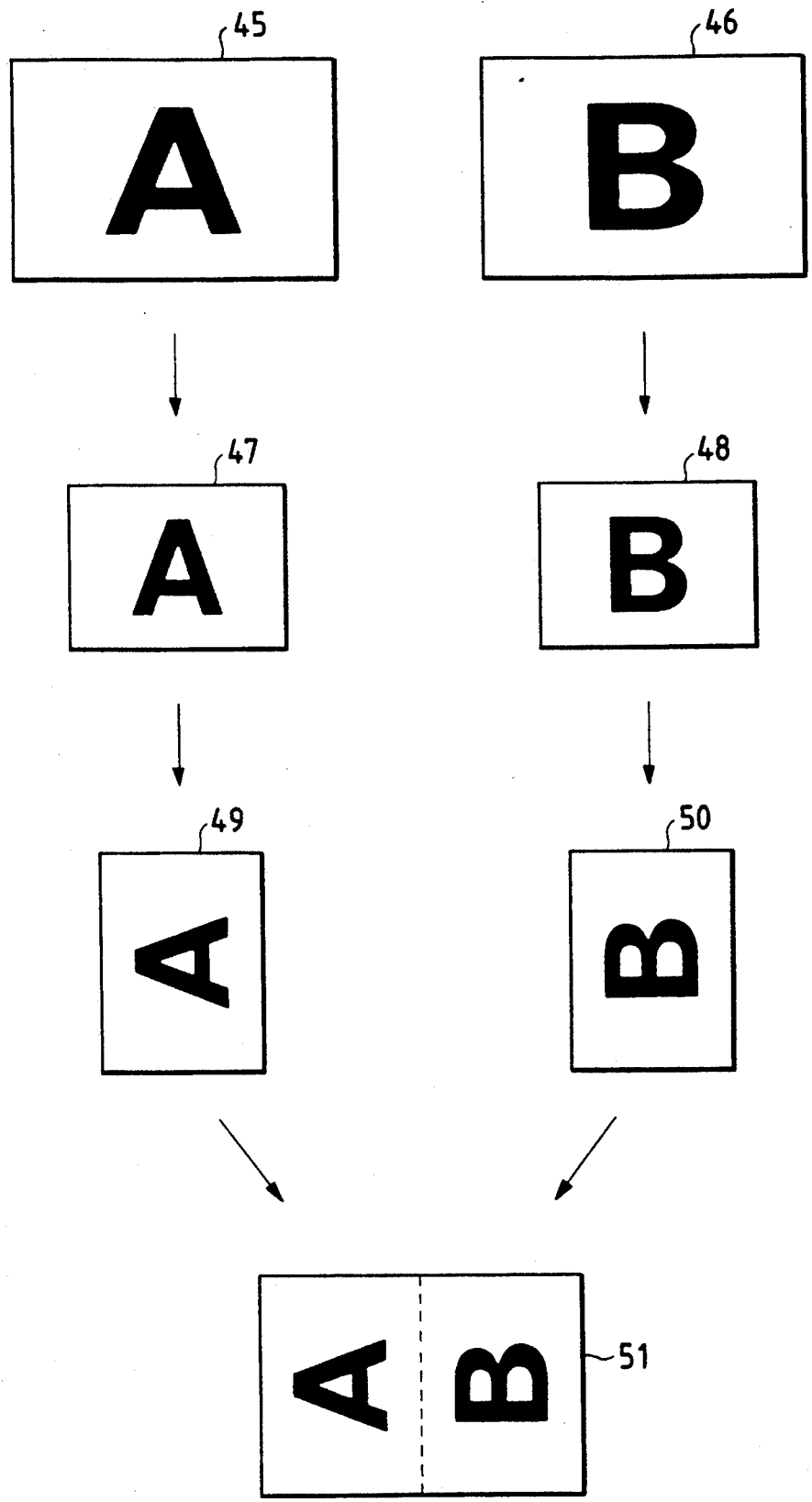
FIG. 13 is an explanatory diagram showing one example of the image rotation performed by the system of the present invention.

Referring to FIG. 13, an exemplary job control sheet 100 has sheet detecting marks 101a, 101b, 101c and 101d, in the form of, for example, bar codes, which are disposed on the four corners thereof. Within the area that is defined by the marks 101a to 101d are provided job control designating sections 102a, 102b, . . . for defining attributes of a job as machine operating instruction information. The sheet detecting marks 101a to 101d are used to enable the image processing system 10 to distinguish the sheet 100 from document originals, which have no sheet detecting marks. The substantive information encoded into the marks 101a to 101d is related to the direction of the document originals and also used to give instructions for batch processing. For example, the bar codes are recorded such that start bit data, stop bit data and check sum data are successively disposed within in the bar code. The read position is regulated by a plurality of lines adjacent to the bar code in the main scanning direction e.g., lines 20 adjacent to the bar code of marks 101a. In order to prevent an erroneous detection, the widths of bars that constitute a bar code are detected at each line of the plurality of lines and the detected widths are averaged. Such use of bar codes and their detection is described in greater detail in commonly assigned, copending U.S. patent application Ser. No. Ser. No. 595,215 which is hereby incorporated by reference.

The attributes of a job, that is, the requirements for performing a job are designated by a user in designating areas of the job control sheet 100. Such designating areas include, e.g., a paper size designating area 102a, a number of copies to be made designating area 102b, etc. The job requirements are entered by a user in check areas 103 in the form of visible and decipherable information in paper size designating area 102a to record a desired magnification or reduction. It should be noted here that the attributes of a job serve as machine operating instruction information for executing image processing of input image information read from the associated document originals in order to generate output image information, and then to output the output image information from an output unit of image processing system 10.

Figure 4:
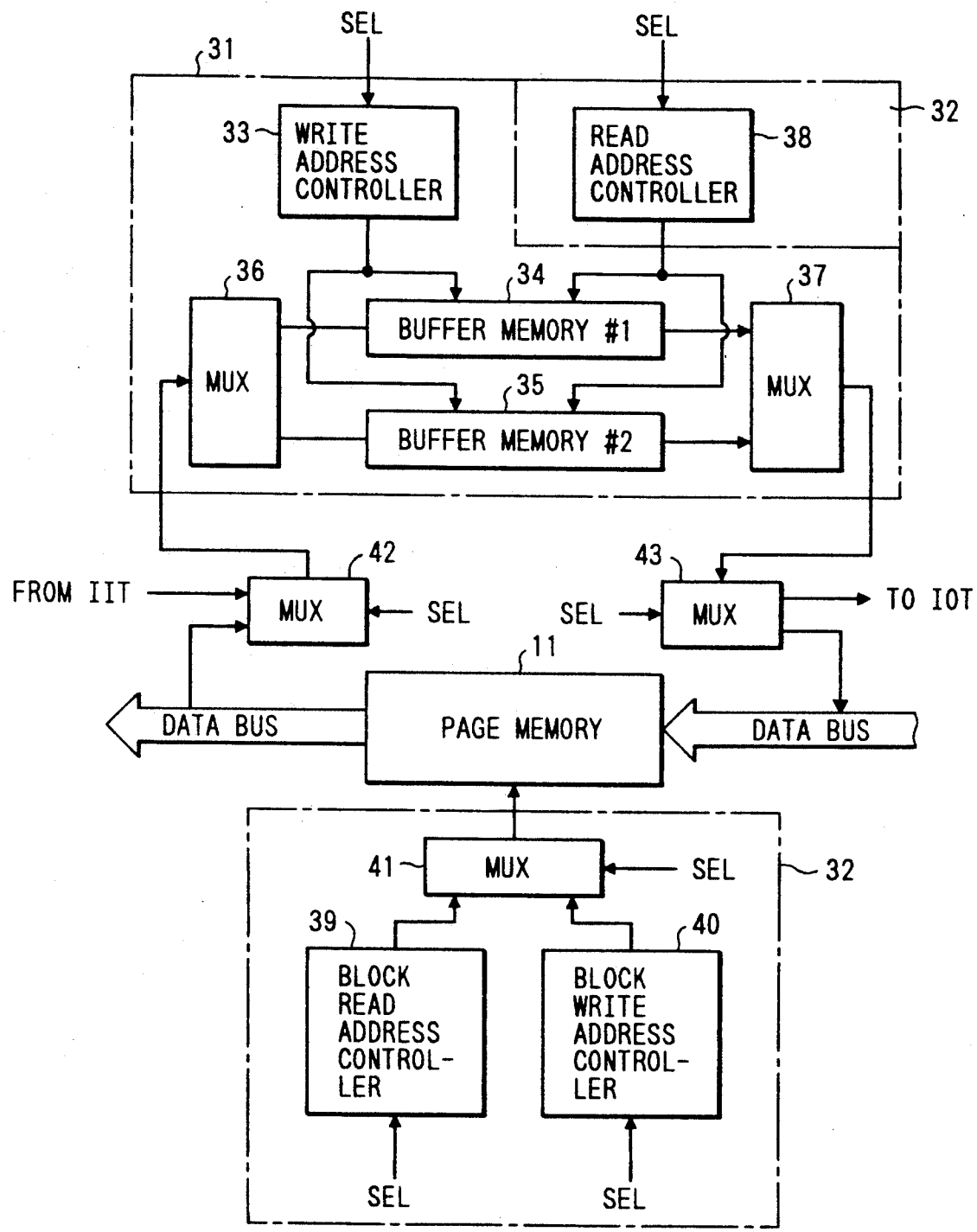
FIG. 4 is a block diagram showing an arrangement of a rotating unit in the image processing system of the present invention.

Rotating unit 9 will now be described in detail. A rotating unit may be employed which can rotate an image 90° CW, 90° CCW, or 180°. However, since it is necessary for rotating unit 9 to rotate multi-bit image data, a rotating unit as shown in FIG. 4 is preferably employed. The rotating unit includes a block inside rotating section 31, block rotating section 32, write address controller ("WAC") 33, designate buffer memories 34 and 35, designate MUXs 36 and 37, read address controller ("RAC") 38, block read address controller ("BRAC") 39, block write address controller ("BWAC") 40, MUXs 41-43, and page memory 11.

Block inside rotating section 31 includes buffer memories 34 and 35 and WAC 33 for specifying addresses for writing input image data in buffer memories 34 and 35. Block rotating section 32 includes RAC 38 for specifying the order of reading image data from buffer memories 34 and 35, BWAC 40 for producing an address for writing image data in page memory 11 for every block, and BRAC 39 for specifying the order of reading image data from page memory 11.

In rotation of an image with the rotating unit, the image is handled in the form of blocks. The number of pixels B of one side of an image block is:

$$B = N_D/N_M$$

where $N_M$ is the number of bits of one pixel, and $N_D$ is the data bus length.

Therefore, the number of pixels of one block is:

$$(N_D/N_M) \times (N_D/N_M)$$

The image data outputted by IIT 1 is four bits per pixel. Therefore, when the data bus length is 16 bits the block size is 16 pixels arranged in a four pixel by four pixel matrix. Hence, when the maximum number of pixels of one line of an original image read with IIT 1 is represented by N, then each of buffer memories 34 and 35 should have a capacity of 16N bits.

The image data outputted by FAX 2 or PC 3 comprises one bit per pixel. In this case, the size of the image block is 16 pixels × 16 pixels. This block size change is carried out by control unit 17. Control unit 17, recognizing the numbers of bits of the image data outputted by the various devices, can change the block size when one of the image data provided by the devices is selected to be rotated.

Figure 5A:
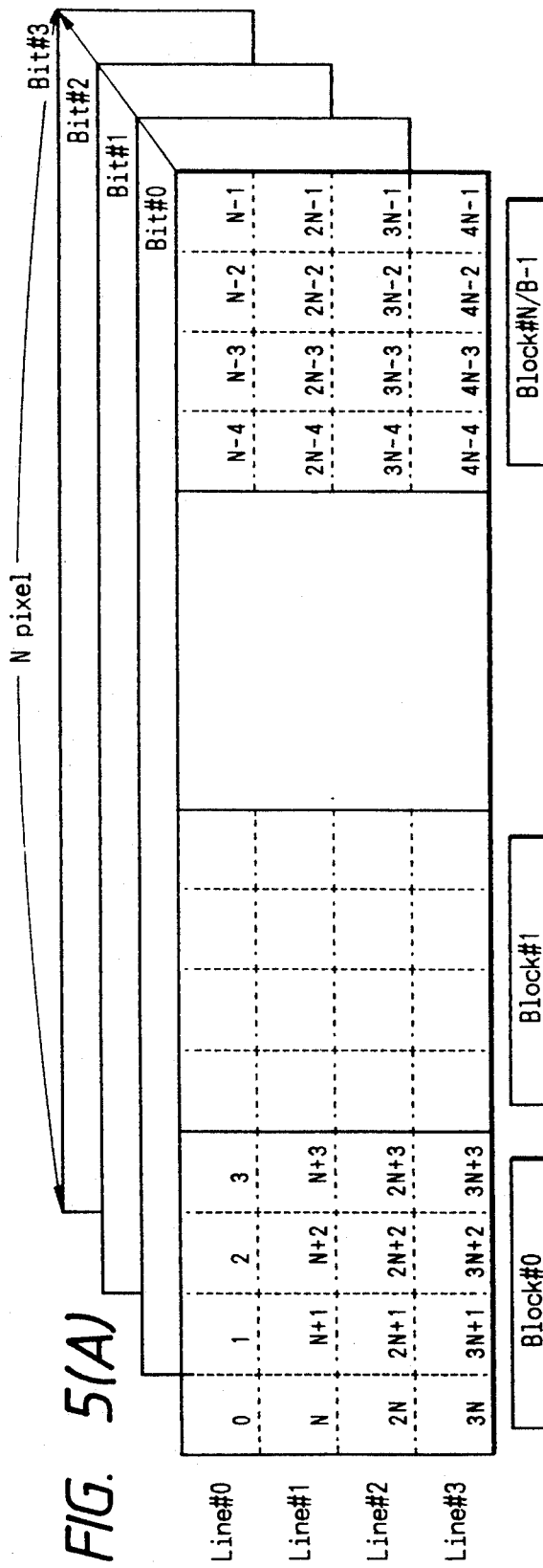
FIGS. 5(A) and 5(B) are explanatory diagrams showing examples of the arrangement of a buffer memory in the image processing system of the invention.
Figure 5B:
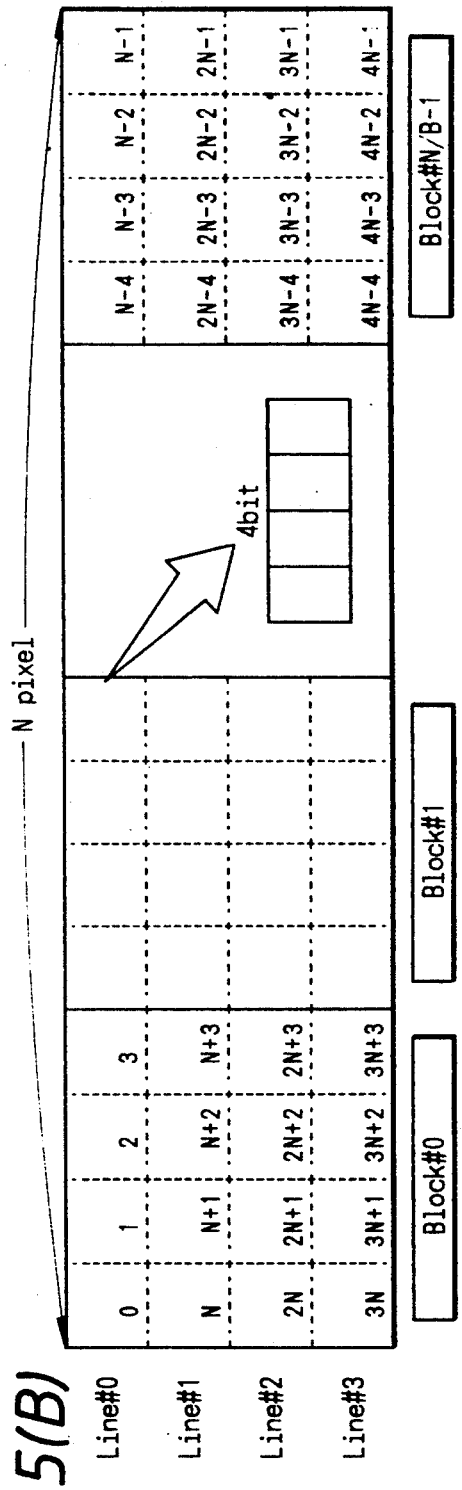

Buffer memories 34 and 35 may be a bit plane system of four 1-bit DRAMs as shown in FIG. 5(A), or one 4-bit DRAM as shown in FIG. 5(B). The purpose of providing two buffer memories 34 and 35, as shown in FIG. 4, is to write image data in one of the buffer memories while image data is being read from the other.

The operation of the rotating unit shown in FIG. 4 will now be described. When the image data read with the IIT 1 is rotated so as to be stored in page memory 11, the rotating unit operates as follows. For convenience, it is assumed that compressing unit 10 has been placed in the through mode by control unit 7. Four rotation modes are available; a through mode (no rotation), a 90° CW rotation mode, 90° CCW rotation mode, and a 180° rotation mode.

In response to an SEL signal, MUX 42 supplies the output image data of IIT 1 to MUX 36. MUX 43 applies the image data obtained through MUX 37 to the data bus of page memory 11, and MUX 41 supplies the address provided by BWAC 40 to page memory 11. Furthermore, in response to the SEL signal, RAC 38 is set so as to read image data from buffer memories 34 and 35 for every block.

When the rotation mode specified by the SEL signal is the through mode, WAC 33 generates an address to write input image data, in the given order, in one of buffer memories 34 and 35 which is enabled to write data. As a result, the image data of the 0-th pixel of the 0-th line is written in the 0-th address in the buffer memory shown in FIGS. 5(A) and 5(B). The image data of the first pixel of the first line is written in the first address, and so forth.

Thus, it is assumed that in the memory space of the buffer memory the addresses of one image block are determined according to the X-Y coordinate system. In the through mode, WAC 33 produces an image data writing address ADDO according to the following equation (1):

$$ADDO = X + YN \quad (1)$$

For the pixel having coordinates (0,0), for the 0-th pixel of the 0-th line, ADDO=0, and its image data is written in the 0-th address. For the pixel having coordinates for the 2nd pixel of the 3rd line, ADDO=2+3N, and its image data is written in the (3N+2)-th address. Thus, in the through mode, WAC 33 produces addresses to write image data in a series of addresses in the buffer memory.

When the image data for four lines have been written in one of the buffer memories in the above-described manner, RAC 38 starts reading data from one buffer memory, and writing data in the other buffer memory.

RAC 38 controls reading addresses so that image data will be read from buffer memories 34 and 35 for every block. It is assumed that the buffer memory is as shown in FIG. 5(A). RAC 38 reads the image data of block #0, the image data of block #1, the image data of block #2, and so on. Thus, RAC 38 reads the image data in the order of block numbers.

The image data read from buffer memories 34 and 35 are applied through MUXs 37 and 43 to the data bus, and written in page memory 11. In this operation, BWAC 40 produces the top address ADDBO of a block according to the following equation (2). This address is used to write the image data in the page memory 11 in the through mode.

$$ADDBO = N\,BX + N(N\,BY) \quad (2)$$

Figure 6:
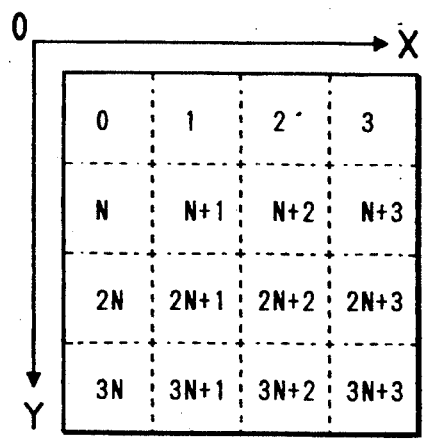
FIG. 6 is an explanatory diagram showing the addresses in an image block for a description of a block inside rotation.
Figure 7:
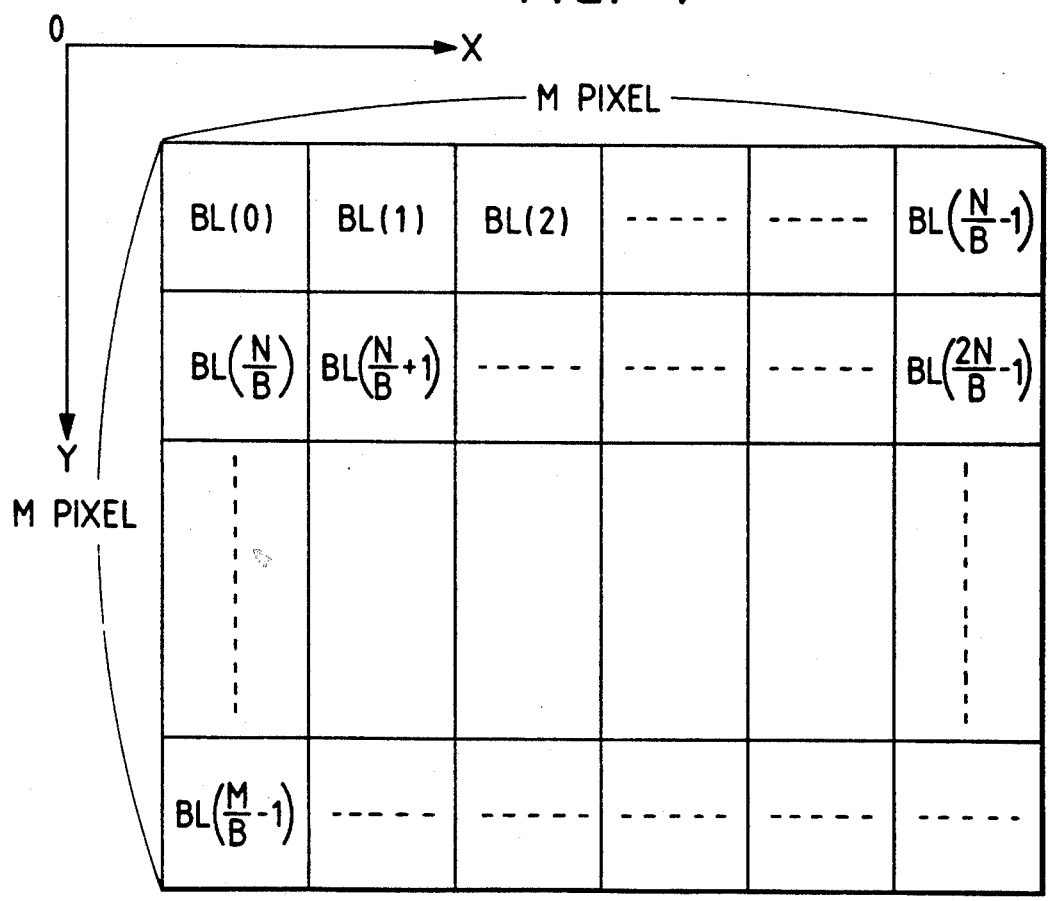
FIG. 7 is an explanatory diagram for a description of a block rotation.

ADDBO is the address in page memory 11 in which the pixel corresponding to the coordinates (0,0) of the image block shown in FIG. 6 is to be written. N BX and N BY are the positions in the X direction and in the Y direction, respectively, where, as shown in FIG. 7, when the image is rotated in the rotation mode, each image block should be positioned in the whole image. N BX=0 to (N/B-1), and NBY=0 to (M/B-1).

In FIG. 7, BL denotes the position of a block in page memory 11.

After the block top address is obtained in the above-described manner, BWAC 40 controls addresses so as to write words as much as the block size B.

Thus, in the through mode, the position of the blocks are maintained unchanged. For instance, the 0-th block read by IIT 1 has coordinates (0,0), and its top address is ADDBO=0 according to equation (2). Therefore, it is positioned at BL(0) in FIG. 7. Similarly, the first block has coordinates (1,0), and its top address is ADDBO=1. Therefore, it is positioned at BL(1) in FIG. 7.

When the 90° CW rotation mode is specified by the SEL signal, WAC 33 produces addresses for writing input image data according to the following equation (3):

$$ADDCW = (X\%B) N + (B - 1 - Y) \quad (3)$$

where (X%B) is the remainder provided when X is divided by B.

In this case, B=4, and therefore the equation (3) can be rewritten as follows:

$$ADDCW = (X\%4) N + (3 - Y) \quad (4)$$

Accordingly, the image of block 30 in FIGS. 5(A) or 5(B), is rotated. The same thing can be said about the remaining blocks.

After being rotated, the input image blocks are written in buffer memories 34 and 35 under the address control of WAC 33.

The image data thus stored are read out under the control of RAC 38 block by block and written in page memory 11. In this operation, BWAC 40 produces, according to the following equation (5), the top address ADDBCW of a block to write an image in page memory 11, which image has been rotated 90° clockwise:

$$ADDBCW = M(N BX) + (M/B - 1 - N BY) \quad (5)$$

Upon provision of the block top address, BWAC 40 performs address control to write words as much as the block size B.

Figures 8, 9:
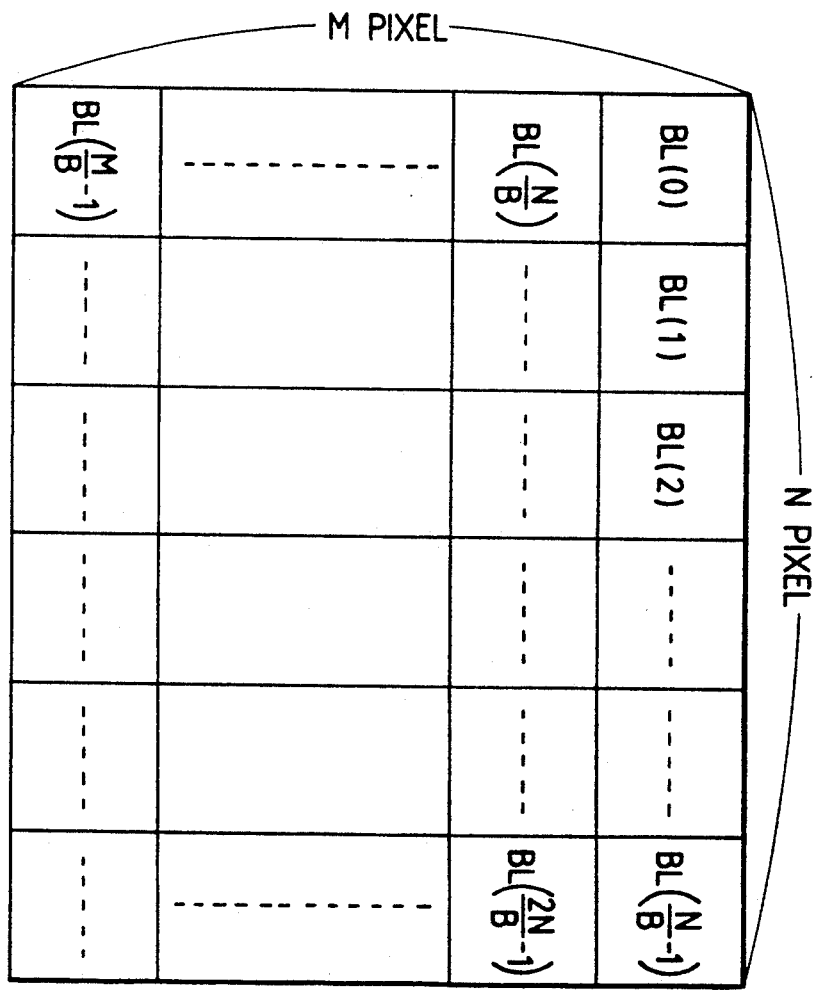
FIG. 8 is an explanatory diagram for a description of a block inside rotation in a CW 90° rotation mode.
FIG. 9 is an explanatory diagram for a description of a block rotation in the CW 90° rotation mode.

Thus, in the 90° CW rotation mode, the blocks are arranged in page memory 11 as shown in FIG. 9 with the result that the page has been turned in its entirety.

When the SEL signal specifies the 90° CCW rotation mode, WAC 33 produces an address ADDCCW for writing input image data according to the following equation (6):

$$ADDCCW = (B - 1 - X\%B) N + Y \quad (6)$$

In this case, B=4, and therefore equation (6) can be rewritten into the following equation (7):

$$ADDCW = (3 - X\%B) N + Y \quad (7)$$

In this case, the image of block #0 in FIG. 5(A) or 5(B) is rotated, as shown in FIG. 10. The same thing can be said about the other blocks.

After being rotated, the input image blocks are written in the buffer memories under the address control of WAC 33.

The stored image data are read out under the control of RAC 38 block by block and written in page memory 11. In this operation, BWAC 40 produces, according to the following equation (8) the top address ADDBCCW of a block to write an image in the page memory 11, which image has been rotated 90° counter clockwise:

$$ADDBCCW = (N/B - 1 - N BX) M + N BY \quad (8)$$

When the block top address has been obtained in the above-described manner, the BWAC 40 performs an address control to write words as much as the block size B.

Thus, in the CCW 90° rotation mode, the blocks are rearranged in page memory 11 as shown in FIG. 11. Therefore, the page has been rotated in its entirety.

When the SEL signal specifies the 180° rotation mode, WAC 33 performs the address calculation in the 90° CW mode or in the 90° CCW mode twice to produce a writing address. Instead of this method, of course, a method may be employed in which equations are obtained for these address calculations and the writing address is produced according to the equations thus obtained. Similarly, BWAC 40 performs a writing address producing operation, whereby the image turned through 180° can be stored in page memory 11, as is obvious to the person skilled in the art.

In writing the output image data of IIT 1 in the page memory 11, the image rotation is carried out as described above.

The image rotation when applying image data from page memory 11 to IOT 15 will now be described. In reading image data from page memory 11 and applying it to IOT 15, control unit 17 applies a predetermined SEL signal to WAC 33, BRAC 39, RAC 38 and MUXs 41, 42, and 43. As a result, MUX 42 is set to apply image data read from page memory 11 to MUX 36, MUX 43 is set to apply image data obtained through MUX 37 to IOT 15, MUX 41 is set to supply a read address provided by BRAC 39 to page memory 11, and RAC 38 is set so as to read image data from buffer memories 34 and 35 line by line. The image data read from page memory 11 is fed back to MUX 8 through expanding unit 13, and applied to MUX 42. If the image data in page memory 11 have not been compressed yet, expanding unit 13 is placed in the through mode. If the image data have been compressed, expanding unit 13 is placed in the expansion mode, so that the image data are restored to the original image data, which are fed back. During this operation, compressing unit 10 is in the through mode.

In applying image data to IOT 15, the image data must be read so that an image rotated as desired is obtained. Accordingly, the image data must be stored in buffer memory 34 or 35 in such a manner that the desired rotated image has been formed. For this purpose, the image blocks must be read from page memory 11 in the order that the desired rotated image is obtained.

Thus, in the circuitry of FIG. 4, BRAC 39 produces addresses for reading image data from page memory 11 block by block in the order that the image data is read from buffer memory 34 or 35 and applied to IOT 15.

The image data form the desired rotated image specified by the SEL signal. For instance, when image data are stored in page memory 11 as shown in FIG. 7, and the SEL signal specifies the 90° CCW rotation mode, BRAC 39 first reads the block at the position BL(N/B−1), then reads the block at the position BL(2N/B−1), and so on. The same thing can be said about the through mode, the 90° CW rotation mode, and the 180° rotation mode.

The image blocks read sequentially from page memory 11 according to the reading addresses produced by BRAC 39 are rotated as required, and written in buffer memory 34 or 35 with the aid of WAC 33. In this case, the writing addresses for rotation of the image blocks are produced substantially in the same manner as described above.

Thus, the image data of four lines, which have been rotated, are written in buffer memory 34 or 35. The image data are read from the buffer memory line by line with the aid of RAC 38, and applied through MUXs 37 and 43 to IOT 15, so that they are outputted as a hard copy.

The rotation of the image data of four bits per pixel has been described. The image data of one bit per pixel outputted by FAX 2 or PC 3 can be rotated in the same manner.

Now, the operation of the image processing system shown in FIG. 1 will be described in its entirety. First, in the case where UI 16 sets a copy job that specifies that IIT 1 read an original image and output one copy of the image, control unit 17 applies an original reading instruction to IIT 1 and causes MUX 8 to connect IIT interface 7 to rotating unit 9. Control unit 17 places rotary unit 9, compressing unit 10, and expanding unit 13 in the through mode. As a result, IIT 1 reads the original image, and outputs image data of four bits per pixel. The image data thus outputted is applied through IIT interface 7, MUX 8, rotating unit 9, compressing unit 10, expanding unit 13, and IOT interface 14 to IOT 15, where the original image is reproduced. A method may be employed in which compressing unit 10 and the expanding unit 13 are placed in the compression mode and in the expansion mode, respectively, so that the compressed image data is temporarily stored in page memory 11 and then read therefrom.

When UI 16 issues a copy job to output a plurality of copies of the original image, control unit 17 places rotating unit 9 in the through mode, compressing unit 10 in the compression mode, and expanding unit 13 in the expansion mode. As a result, image data represented by four bits per pixel, which is obtained by reading the original with IIT 1, is reduced in the amount of data being compressed by compressing unit 10, and then is stored in HD 12. The data is read from HD 12 as many times as the number of copies and expanded by expanding unit 13. The output of expanding unit 13 is applied through IOT interface 14 to IOT 15 where the image is reproduced. The original must be read with IIT 1 only once to enable a plurality of copies of the original to be obtained. For the first copy, the image data may be processed with expanding unit 13 and simultaneously stored in HD 12. This method is advantageous in that the first copy of the original image can be outputted quickly.

A multi-function input reception (concurrent job) will now be described. FIG. 12 illustrates the multi-function input reception. When an original image is read and outputted as a hard copy, the operation of IIT 1, as shown in FIG. 12, includes a pre-scan for detecting the size of an original, and also includes main-scans for reading the original to output its image data. Each of the scans includes a scan return in which the scanner, after reading the original, returns to the scan start position. However, it should be noted that IIT 1 outputs the image data only when the main scan is carried out to read the original. Thus, IIT 1 outputs no image data when the pre-scan is performed.

Therefore, during any other time than the reading of the original in the main scan, i.e., during the pre-scan, the scan return, or the pause of IIT 1, MUX 8 is operated to select I/O interface 6 instead of IIT interface 7 so that image data provided by FAX 2 of PC 3 can be processed. This is the multi-function concurrent job. When a plurality of copies of the original are outputted, IIT 1 suspends operation after reading the original; however, during this period the reading of data from HD 12 is carried out for the copy job. Therefore, MUX 8 is not operated while the copy job is being carried out. Hence, if image data is transferred from FAX 2 or PC 3 to I/O processor 5 while IIT 1 is performing the main scan to read the original, or while the copy job is being carried out to output a plurality of copies of the original, the image data is stored in the page buffer until it can be transferred.

The code data transferred from PC 3 is bit-mapped in the page buffer by bit-mapping circuit 4, and is then transferred through I/O interface 6, MUX 6, and rotating unit 9 to compressing unit 10, where it is compressed. The compressed data is stored in HD 12. When the page buffer cannot be used because it already has stored data, compressing unit 10 is placed in the through mode so that the code data is applied, as it is, to HD 12 through I/O interface 6 and MUX 8, or through I/O interface 6 and the bus of HD 12. Alternatively, the data may be applied to HD 12 through the bus of control unit 17 and bus controller 18. When I/O processor 5 becomes free, the stored data in HD 12 is transferred to I/O processor 5 via the route reverse to that described above. In I/O processor 5, the data is bit-mapped in the page buffer by bit-mapping circuit 4, and is then stored in HD 12.

The normal operation and the multi-function concurrent job of the image processing system of the invention have been described. Image rotation now will be further described.

First, when image rotation is specified by UI 16, the system operates as follows. When the operator desires to have a copy of an A4 original by reading it laterally with A4 longitudinal recording sheets selected, UI 16 specifies an image rotation, such as 90° CW. In this case, control unit 17 applies an instruction signal to IIT 1 to start the image reading operation and the SEL signal to rotating unit 9 so that the rotating unit 9 is in the 90° CW rotation mode. Compressing unit 10 and expanding unit 13 are placed in the through mode. As a result, the image data read with IIT 1 is applied through IIT interface 7 and MUX 8 to rotating unit 9, where it is rotated 90° clockwise. The output of rotating unit 9 passes through compressing unit 10 as it is, and is stored in page memory 11 temporarily. The stored image data is read out of page memory 11, and transmitted through expanding unit 13 and IOT interface 14 to IOT 15, where it is outputted as a hard copy.

When a plurality of copies of the original document are to be outputted, the image data is read from page memory 11 as many times as the number of copies required and transmitted to IOT 15 each time. When UI 16 specifies that the image data stored in page memory 11 is to be stored in HD 12 after being compressed, control unit 17 places rotating unit 9 in the through mode, compressing unit 10 in the compression mode, and expanding unit 13 in the through mode. As a result, the image data read from page memory 11 is applied through expanding unit 13, MUX 8, and rotating unit 9 to compressing unit 10, where it is compressed. The output of compressing unit 10 is stored in page memory 11 again, and then is stored in HD 12.

When an image editing operation is carried out with the CRT in the UI 16, the system operates as follows. In order to edit an image, it is necessary to perform various operations. For example, when a desired part of the image must be erased, it is necessary to define the desired part. In the system shown in FIG. 1, the image data read with IIT 1 is stored once in page memory 11. Thereafter, the image data is read out of page memory 11, and applied through expanding unit 13, IOT interface 14, and bus controllers 19 and 20 to UI 16. The image data is displayed on the CRT where it is edited. Depending on the original image reading direction, the image is displayed on the CRT upside down, or turned 90°.

The operator then issues an instruction signal through UI 16 to rotate the image. In response to the instruction signal, control unit 17 places rotating unit 9 in the specified rotation mode, and places compressing unit 10 and expanding unit 13 in the through mode. As a result, the image data read out of page memory 11 is applied through expanding unit 13 and MUX 8 to rotating unit 9, where it is rotated by the specified angle. The output of rotating unit 9 is displayed on the CRT in UI 16. Hence, according to a preferred embodiment of the invention, it is unnecessary for the operator to change the direction of the original before an original is read with IIT 1.

When control unit 17 automatically determines whether or not the image should be turned, the system operates as follows. First, when an instruction is issued to combine two size A3 originals on one size A3 recording sheet, control unit 17 specifies a reading magnification of 70% (in fact, a reduction) for IIT 1, and outputs the SEL signal to place rotating unit 9 in the 90° CCW rotation mode, for example. In addition, control unit 17 places compressing unit 10 in the through mode. As a result, as shown in FIG. 13, first original 45 is read by IIT 1 with the 70% magnification and image data forming a reduced image as indicated at 47 in FIG. 13 is outputted. The image data is turned 90° counterclockwise by rotating unit 9, as indicated at 47 in FIG. 13, and then is stored in page memory 11 at a predetermined address. Similarly, second original 46 is read by IIT 1 with the same magnification 70% and image data forming a reduced image as indicated at 48 in FIG. 13 is outputted. The image data is turned 90° counterclockwise by rotating unit 9 as indicated at 50 in FIG. 13, and then stored in page memory 11 at a predetermined address. In this operation, under the address control of the control unit 7, the image data of the second original is stored in the address next to the address of the image data of the first original. Thus, the two images have been combined into one image. By transmitting the image data from page memory 11 to IOT 15, a copy of the two original images combined can be outputted.

Figure 16A:
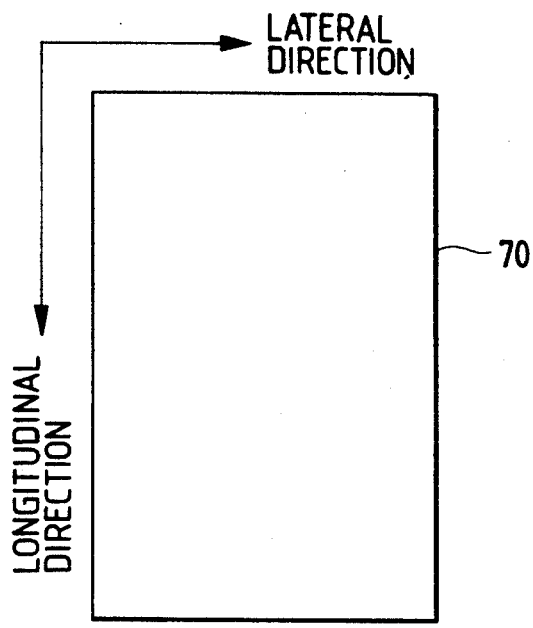
FIGS. 16(A) and 16(B) are explanatory diagrams for a description of difficulties accompanying the conventional image processing system.
Figure 16B:
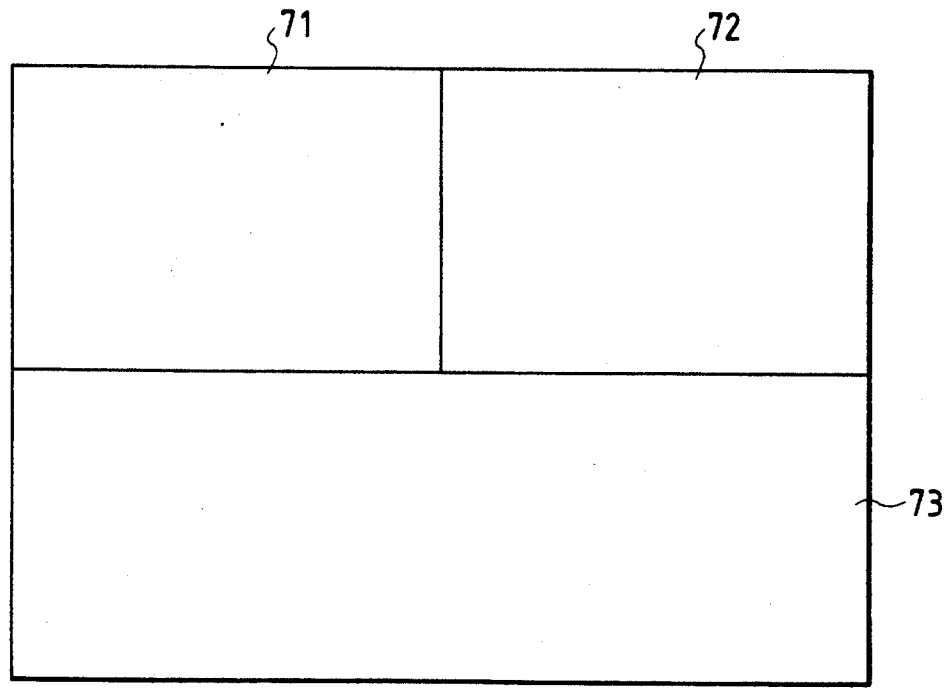
Figure 17:
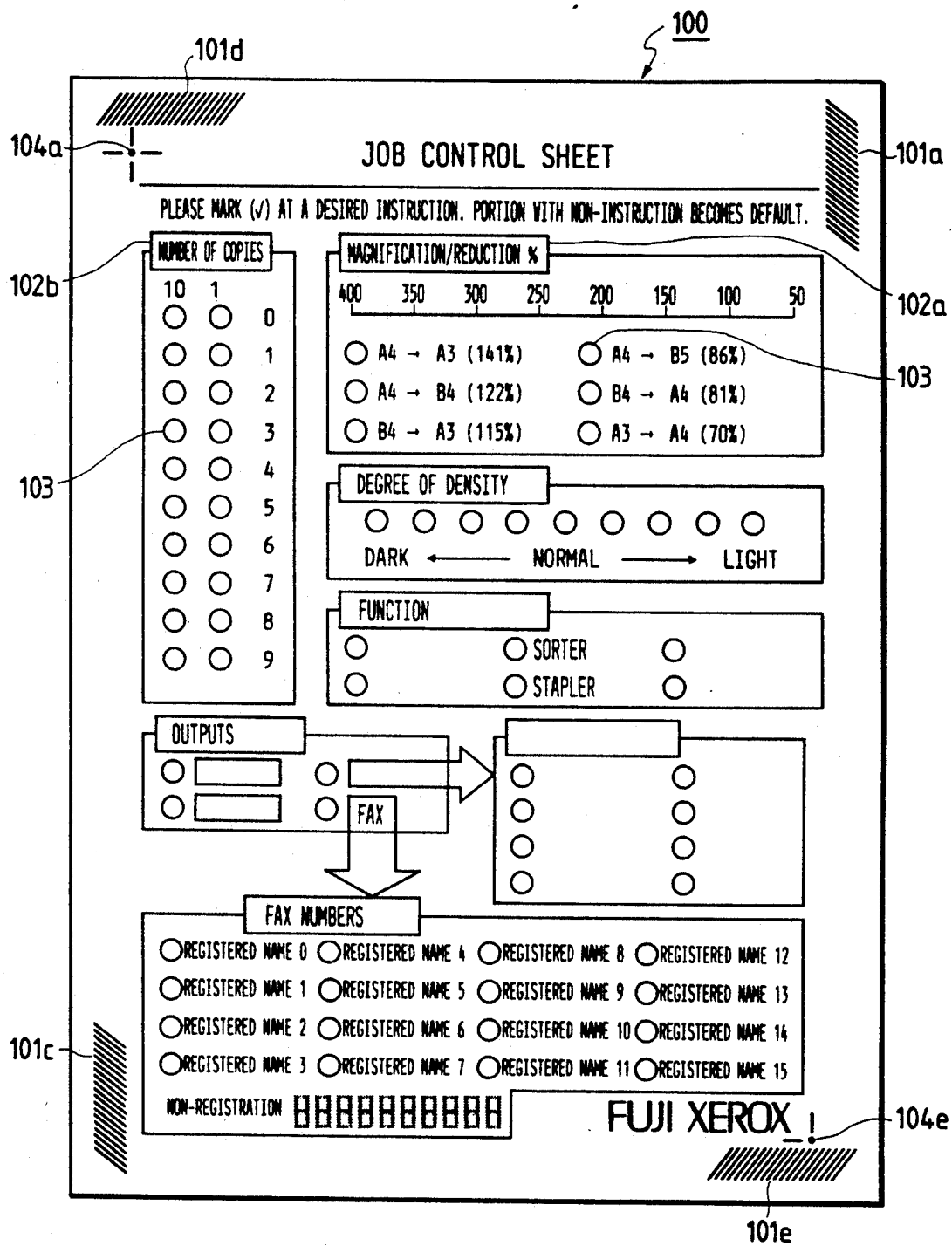
FIG. 17 shows an example of a job control sheet.

In this case, unlike the case shown in FIG. 16(B) in which a blank area is formed on the recording sheet, the two images are combined together without such a blank area, which results in a superior copy.

When the image received through FAX 2 is outputted as a hard copy by IOT 15, the image of a size A4 original generally is transmitted with the lateral direction. Therefore, the received image is of the lateral direction. However, because the copying operation with the longitudinal direction is achieved more quickly than that with the lateral direction, generally size A4 recording sheets are set in the longitudinal direction.

Therefore, when the image received through FAX 2 is of the lateral direction, and only A4 longitudinal recording sheets are set in IOT 15, control unit 17 places rotating unit 9 in the 90° CW rotation mode, and places compressing unit 10 and expanding unit 13 in the through mode. As a result, the image data received through I/O processor 5, I/O interface 6, and MUX 8 is turned 90° clockwise by rotating unit 9 and stored in page memory 11. The stored image data is applied to IOT 15 and is outputted as a hard copy.

When the image read with IIT 1 is transmitted by FAX 2, the image data corresponds to reading an original in the lateral direction. However, the image reading operation by IIT 1 can be achieved more quickly in the longitudinal direction than with the lateral direction. Therefore, when FAX 2 transmits image data representing an A4 original with the lateral direction, and IIT 1 reads the size A4 original with the longitudinal direction, control unit 17 places rotating unit 9 in the 90° CW rotation mode, and places the compressing unit 10 in the through mode. As a result, the image data read by IIT 1 in the longitudinal direction is turned 90° clockwise by rotating unit 9 and then stored in page memory 11. The stored image data is supplied through I/O interface 6 and I/O processor 5 to FAX 2, where it is coded as required. For example, the image data is converted into CCITT codes, which are then transmitted.

When FAX 2 can transmit data from an A4 document scanned in the longitudinal direction, the image data read by IIT 1 can be transmitted without being rotated. However, when it is discovered, as a result of communication, that the FAX of the receiving party can output only to A4 recording sheets in the lateral direction, control unit 17 rotates the image read by IIT 1 before supplying it to FAX 2 similarly as in the above-described case.

The present invention eliminates the problems of the prior art that the original is read again, or that the image data of the original is reduced before transmitted. Thus, the invention contributes to the improvement of the work place efficiency.

When an A4 original document is placed in the lateral direction in IIT 1 and a copy of the original needs to be outputted, the system of the present invention operates as follows. When detecting that size A4 longitudinal recording sheets have been set in IOT 15, control unit 17 places rotating unit 9 in the 90° CW rotation mode, for example, and places compressing unit 10 and expanding unit 13 in the through mode. In this case, outputting 100 copies of the original takes about three minutes when A4 longitudinal recording sheets are used, and about four minutes when size A4 lateral recording sheets are used. Hence, the system operating in this manner contributes to the improvement of the productivity.

If the quantity of A4 longitudinal recording sheets gets low in a conventional image processing system, an alarm is generally given to inform the operator. The copying operation is suspended until the operator replenishes the system with recording sheets.

With the image processing system of the invention shown in FIG. 1, control unit 17 determines whether or not a tray with the same size paper and the proper direction is provided and contains recording sheets. If the tray contains the recording sheets, the copying operation is continued with the recording sheets supplied from the tray. If the tray is empty, control unit 17 determines whether another tray with the same size copy sheets is available. If such a tray is not available, the control unit 17 instructs the operator to replenish the empty tray with recording sheets. If a tray is available and it contains recording sheets that are in a different direction, control unit 17 rotates the image 90° clockwise, for example, to continue the copying operation.

Figure 14:
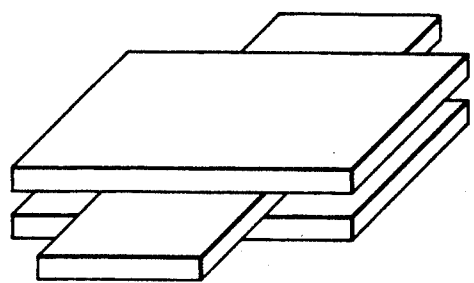
FIG. 14 is a perspective view showing another example of image rotation.
Figure 15:
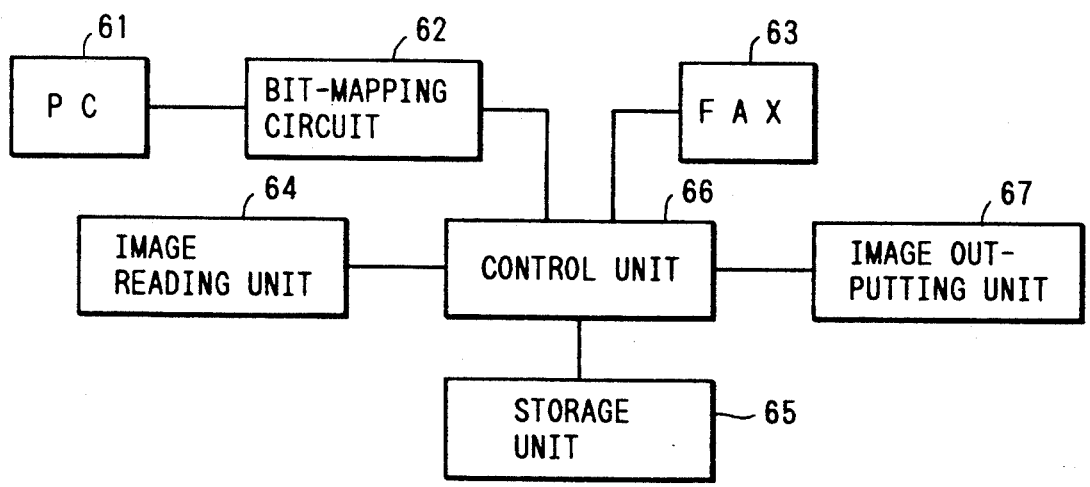
FIG. 15 is a block diagram showing one example of the arrangement of a conventional image processing system.

FIG. 14 illustrates a situation in which output copies are to be laid in different directions so that the jobs or copies can be distinguished easily from one another. In this case, it has been necessary to use a sorter, collator, or a device that will slightly offset the copy discharge position every copy.

The image processing system of the invention shown in FIG. 1, can accomplish the same result by control unit 17 placing rotating unit 9 in the through mode and causing IOT 15 to use longitudinal recording sheets for one copying operation, then placing rotating unit 9 in the 90° CW mode and causing IOT 15 to use lateral recording sheets for another copying operation, and so forth. In other words, for one copy, rotating unit 9 is operated in the through mode and IOT 15 selects longitudinal recording sheets; for the next copy, rotating unit 9 is operated in the 90° CW rotation mode, and IOT 15 selects lateral recording sheets. Thus, the above-described effect can be obtained by the present invention without the need for a sorter or the like. This greatly reduces the manufacturing cost.

As is apparent from the above description, the image processing system according to the present invention can rotate an image when necessary, and is able to deal with a variety of requests given by the operator.

The capability of rotating an image contributes to reduction of copying time, and makes it possible to eliminate the use of a sorter or the like employed in conventional image processing systems. This releases the operator from troublesome operations and remarkably improves productivity.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image recording system comprising:
   an image reading section for reading an image of an original document and for outputting units of image data representing the image;
   storage means for storing said image data units in a predetermined sequence;
   image data reading means coupled to said storage means for reading said image data units; and
   an image outputting unit accommodating different sized copying sheets, said image outputting unit for recording said image data units on said recording sheets to provide hard copies of the original document;
   a job inputting section for setting a copy job including the size of a recording sheet to be used by said image outputting unit;
   a data rotating section for rotating said image data units read by said image reading section;
   a sheet monitoring section for monitoring the type and quantity of recording sheets located in said image outputting unit; and
   a control unit for applying an image data rotating instruction to said data rotating section according to said copy job set by said job inputting section and said quantity and type of recording sheets monitored by said sheet monitoring section such that said image data units are rotated as necessary to enable said image data units to be fully recorded on recording sheets present in said image outputting unit.

2. An image recording system as claimed in claim 1, wherein said control unit causes said data rotating section to rotate said image data so that the size of the recording sheet specified by said copy job agrees with the size of a recording sheet accommodated in said image outputting unit.

3. An image recording system as claimed in claim 1, wherein said copy job further includes the selection of a size of the original document, an order of document pages, and a number of copies to be produced.

4. An image recording system comprising:
   an image reading section for reading an image of an original document and for outputting units of image data representing the image;
   a data reducing/enlarging section for reducing or enlarging said image data units outputted by said image reading section;
   storage means for storing in a predetermined sequence said image data units reduced or enlarged by said data reducing/enlarging section;
   image data reading means coupled to said storage means for reading said reduced or enlarged image data units; and
   an image outputting unit accommodating different sized copying sheets for recording image data units read from said storage unit on said recording sheets to provide hard copies of the original document;
   a job inputting section for setting a copy job including a reducing or enlarging percentage and the size of the recording sheet to be used to record the reduced or enlarged image data units;
   a data rotating section for changing the rotation of said image data units read by said image reading section from said predetermined sequence;
   a sheet monitoring section for monitoring the type and quantity of recording sheets located in said image outputting unit; and
   a control unit for applying an image data rotating instruction to said data rotating section and a reducing/enlarging instruction to said reducing/enlarging section according to said copy job set by said job inputting section and said quantity and type of recording sheets monitored by said sheet monitoring section such that the rotation and reduction/enlargment of image data units is changed as necessary to enable said image data units to be fully recorded on recording sheets present in said image outputting unit.

5. An image recording system as claimed in claim 4, wherein said control unit controls said data rotating section to selectively rotate said image data units to provide a rotated sequence of image data units such that the image of the original document enlarged or reduced in accordance with said reducing or enlarging percentages may be recorded on recording sheets located in said image outputting unit.

6. An image recording system as claimed in claim 5, wherein said control unit controls said data rotating section to selectively rotate said image data units by 90° clockwise.

7. An image recording system as claimed in claim 5, wherein said control unit controls said data rotating section to selectively rotate said image data units by 90° counterclockwise.

8. An image recording system as claimed in claim 5, wherein said control unit controls said data rotating section to selectively rotate said image data units by 180°.

9. An image recording system as claimed in claim 4, wherein said copy job further includes the selection of a size of the original document, an order of document pages, and a number of copies to be produced, and wherein said control unit controls said data rotating section and said image outputting section to perform the copy job by outputting the selected number of copies with pages in the selected order and recorded on paper having a size equal to that of the selected original document size.

10. An image recording system as claimed in claim 4, wherein said storage means includes a page memory, a first buffer memory, and a second buffer memory.

11. An image recording system comprising:
an image reading section for reading an image of an original document and for outputting units of image data representing the image;
storage means for storing said image data units in a predetermined sequence;
image data reading means coupled to said storage means for reading said image data units;
an image outputting unit accommodating different sized copying sheets, said image outputting unit for recording said image data units on said recording sheets to provide hard copies of the original document;
a job inputting section for setting a copy job including format data for the original document and the size of a recording sheet to be used by said image outputting unit;
a data rotating section for changing the rotation of said image data units read by said image reading section from said predetermined sequence;
a sheet monitoring section for monitoring the type and quantity of recording sheets located in said image outputting unit; and
a control unit for applying an image data rotating instruction to said data rotating section according to said copy job set by said job inputting section including said format data and said quantity and type of recording sheets monitored by said sheet monitoring section such that the rotation of image data units is changed as necessary to enable said image data units to be fully recorded on recording sheets present in said image outputting unit.

12. An image recording system as claimed in claim 11, wherein said format data indicates the orientation for recording the image on the recording sheet, and wherein said control unit controls said data rotating section to selectively rotate said image data units to provide a rotated sequence of image data units such that the image of the original document is recorded with said orientation on recording sheets located in said image outputting unit.

13. An image recording system as claimed in claim 12, wherein said control unit controls said data rotating section to selectively rotate said image data units by 90° clockwise.

14. An image recording system as claimed in claim 12, wherein said control unit controls said data rotating section to selectively rotate said image data units by 90° counterclockwise.

15. An image recording system as claimed in claim 12, wherein said control unit controls said data rotating section to selectively rotate said image data units by 180°.

16. An image recording system as claimed in claim 11, wherein said copy job further includes the selection of a size of the original document, an order of document pages, and a number of copies to be produced, and wherein said control unit controls said data rotating section and said image outputting section to perform the copy job by outputting the selected number of copies with pages in the selected order and recorded on paper having a size equal to that of the selected original document size.

17. An image recording system comprising:
an image reading section for reading an image of an original document and for outputting units of image data representing the image;
an image data inputting section for inputting image attribute data associated with said image data units;
storage means for storing said image data units in a predetermined sequence and for storing said image attribute data;
image data reading means coupled to said storage means for reading said image data units and said image attribute data; and
an image outputting unit accommodating different sized copying sheets, said image outputting unit for recording said image data units on said recording sheets to provide hard copies of the original document;
a job inputting section for setting a copy job for said image data units read by said image reading section and said associated image attribute data provided by said image data inputting section;
a data rotating section for changing the rotation of said image data units read by said image reading section from said predetermined sequence;
a sheet monitoring section for monitoring the type and quantity of recording sheets located in said image outputting unit; and
a control unit for applying an image data rotating instruction to said data rotating section according to said copy job set by said job inputting section and said quantity and type of recording sheets monitored by said sheet monitoring section such that the rotation of image data units is changed as necessary to enable said image data units to be fully recorded on recording sheets present in said image outputting unit in accordance with said associated image attribute data.

18. An image recording system as claimed in claim 17, wherein said control unit controls said data rotating section to selectively rotate said image data units to provide a rotated sequence of image data units such that the image of the original document may be recorded on recording sheets located in said image outputting unit.

19. An image recording system as claimed in claim 18, wherein said control unit controls said data rotating section to selectively rotate said image data units by 90° clockwise.

20. An image recording system as claimed in claim 18, wherein said control unit controls said data rotating section to selectively rotate said image data units by 90° counterclockwise.

21. An image recording system as claimed in claim 18, wherein said control unit controls said data rotating section to selectively rotate said image data units by 180°.

22. An image recording system as claimed in claim 17, wherein said copy job further includes the selection of a size of the original document, an order of document pages, and a number of copies to be produced, and wherein said control unit controls said data rotating section and said image outputting section to perform the copy job by outputting the selected number of copies with pages in the selected order and recorded on paper having a size equal to that of the selected original document size.

23. An image recording system comprising:
an image data inputting section for inputting data representing an image;
storage means for storing said image data inputted by said image data inputting section as units of image data, said image data units being stored in a predetermined sequence;
image data reading means coupled to said storage means for reading said image data units; and
an image outputting unit accommodating different sized copying sheets, said image outputting unit for recording said image data units on said recording sheets to provide hard copies of the image;
a job inputting section for setting a copy job including the size of a recording sheet to be used by said image outputting unit and image attribute data associated with said image data units;
a data rotating section for changing the rotation of said image data units read by said image inputting section from said predetermined sequence;
a sheet monitoring section for monitoring the type and quantity of recording sheets located in said image outputting unit; and
a control unit for applying an image data rotating instruction to said data rotating section according to said copy job set by said job inputting section, said image attribute data, and said quantity and type of recording sheets monitored by said sheet monitoring section such that the rotation of image data units is changed as necessary to enable said image data units to be fully recorded on recording sheets present in said image outputting unit.

24. An image recording system as claimed in claim 23, wherein said image attribute data indicates the orientation with which the image is to be recorded on said recording sheet, and wherein said control unit controls said data rotating section to selectively rotate said image data units to provide a rotated sequence of image data units that may be recorded with said indicated orientation on recording sheets located in said image outputting unit.

25. An image recording system as claimed in claim 24, wherein said control unit controls said data rotating section to selectively rotate said image data units by 90° clockwise.

26. An image recording system as claimed in claim 24, wherein said control unit controls said data rotating section to selectively rotate said image data units by 90° counterclockwise.

27. An image recording system as claimed in claim 24, wherein said control unit controls said data rotating section to selectively rotate said image data units by 180°.

28. An image recording system as claimed in claim 23, wherein said copy job further includes the selection of a size of the original document, an order of document pages, and a number of copies to be produced, and wherein said control unit controls said data rotating section and said image outputting section to perform the copy job by outputting the selected number of copies with pages in the selected order and recorded on paper having a size equal to that of the selected original document size.

29. An image recording system comprising:
an image reading section for reading an original document bearing an image and a job input sheet associated with said original document for specifying image recording instructions, said image reading section for outputting units of image data representing the image and job data indicating the recording instructions;
a storage means for storing said image data units in a predetermined sequence;
image data reading means coupled to said storage means for reading said image data units; and
an image outputting unit accommodating different sized copying sheets, said image outputting unit for recording said image data units on said recording sheets to provide hard copies of the original document, said image outputting unit including:
a data rotating section for changing the rotation of said image data units read by said image reading section from said predetermined sequence;
a sheet monitoring section for monitoring the type and quantity of recording sheets located in said image outputting unit; and
a control unit for applying an image data rotating instruction to said data rotating section according to said job data and said quantity and type of recording sheets monitored by said sheet monitoring section such that the rotation of image data units is changed as necessary to enable said image data units to be fully recorded on recording sheets present in said image outputting unit in accordance with said job data.

30. An image recording system as claimed in claim 29, wherein said control unit controls said data rotating section to selectively rotate said image data units to provide a rotated sequence of image data units that may be recorded on recording sheets located in said image outputting unit.

31. An image recording system as claimed in claim 30, wherein said control unit controls said data rotating section to selectively rotate said image data units by 90° clockwise.

32. An image recording system as claimed in claim 30, wherein said control unit controls said data rotating section to selectively rotate said image data units by 90° counterclockwise.

33. An image recording system as claimed in claim 30, wherein said control unit controls said data rotating section to selectively rotate said image data units by 180°.

34. An image recording system as claimed in claim 29, wherein said job data further includes the selection of a size of the original document, an order of document pages, and a number of copies to be produced, and wherein said control unit controls said data rotating section and said image outputting section to perform a copy job by outputting the selected number of copies with pages in the selected order and recorded on paper having a size equal to that of the selected original document size.

35. An image recording system comprising:
an image reading section for reading an original document bearing an image, said image reading section for outputting units of image data representing the image on the original document;
storage means for storing said image data units in a predetermined sequence;
image data reading means coupled to said storage means for reading said image data units; and
an image outputting unit accommodating different sized copying sheets, said image outputting unit for recording said image data units on said recording sheets to provide hard copies of the original document;
a job sheet reading section for reading a job input sheet associated with the original document and for specifying job sheet control data associated with the recording of said image data units;
a job inputting section for inputting a copy job and for specifying a job input control data associated with the recording of said image data units;
a data rotating section for rotating said image data units read by said image reading section;
a sheet monitoring section for monitoring a quantity of recording sheets accommodated in said image outputting unit;
a job synthesizing section for synthesizing said job sheet control data and said job input control data to produce final job data specifying the recording operations to be performed by said image outputting unit; and
a control unit for applying an image data rotating instruction to said data rotating section according to said final job data and said quantity and type of recording sheets monitored by said sheet monitoring section such that the rotation of image data units is changed as necessary to enable said image data units to be fully recorded on recording sheets present in said image outputting unit in accordance with said final job control data.

36. An image recording system as claimed in claim 35, wherein said control unit controls said data rotating section to selectively rotate said image data units to provide a rotated sequence of image data units that may be recorded on recording sheets located in said image outputting unit.

37. An image recording system as claimed in claim 36, wherein said control unit controls said data rotating section to selectively rotate said image data units by 90° clockwise.

38. An image recording system as claimed in claim 36, wherein said control unit controls said data rotating section to selectively rotate said image data units by 90° counterclockwise.

39. An image recording system as claimed in claim 36, wherein said control unit controls said data rotating section to selectively rotate said image data units by 180°.

40. An image recording system as claimed in claim 35, wherein said final job data further includes the selection of a size of the original document, an order of document pages, and a number of copies to be produced, and wherein said control unit controls said control data rotating section and said image outputting section to perform a copy job by outputting the selected number of copies with pages in the selected order and recorded on paper having a size equal to that of the selected original document size.

41. An image recording system as claimed in claim 35, in which said control unit causes said data rotating section to rotate said image data so that the size of a recording sheet specified by said final copy job coincides with the size of a recording sheet located in said image outputting unit.

42. An image recording system as claimed in claim 35, in which said job synthesizing section gives precedence to said job input control data over said job sheet control data when generating said final job control data.

43. An image recording system for making multiple copies of an original document comprising:
an image reading section for reading an image of the original document and for outputting units of image data representing the image;
storage means for storing said image data units in a predetermined sequence;
image data reading means coupled to said storage means for reading said image data units; and
an image outputting unit accommodating a source of first rectangular copy sheets and a source of second rectangular copy sheets equal in dimensions to said first rectangular copy sheets, said image outputting unit for feeding said first rectangular copy sheets with a first orientation and said second rectangular copy sheets with a second orientation corresponding to said first orientation rotated by 90°, and for recording said image data units on said first and second copy sheets to provide multiple hard copies of the original document, said image outputting unit including:
a data rotating section for changing the rotation of said image data units read by said image reading section from said predetermined sequence; and
a control unit for applying image data rotating instructions to said data rotating section and for applying a paper selection instruction to said image outputting unit to cause said image outputting to alternately output a hard copy of the original document on said first rectangular copy sheets with said first orientation with a hard copy of the original document recorded on said second rectangular copy sheets having said second orientation.

44. An image recording system as claimed in claim 43, wherein said control unit applies image data rotating instructions to said data rotating section so that the first of said multiple copies are output without rotation of said image data units.

* * * * *